Oct. 19, 1971  J. TARNER  3,613,380

METHOD OF SUPPORTING WARM PIPELINE ARCTIC REGION

Filed June 18, 1969

INVENTOR.
JACK TARNER
BY Young & Quigg
ATTORNEYS

United States Patent Office 3,613,380
Patented Oct. 19, 1971

3,613,380
METHOD OF SUPPORTING WARM PIPELINE IN ARCTIC REGION
Jack Tarner, Bartlesville, Okla., assignor to Phillips Petroleum Company
Filed June 18, 1969, Ser. No. 834,442
Int. Cl. E02d 27/36, 27/46; F16l 1/00
U.S. Cl. 61—46
9 Claims

ABSTRACT OF THE DISCLOSURE

A stable pipeline in permafrost areas is achieved by laying pipe on spaced supports extending away from the pipeline and into the solidly frozen permafrost so as to prevent sinking of the pipeline into a thawed zone produced by heat leakage from warm fluid carried in the pipeline.

---

My invention relates to the laying of pipelines in permafrost areas. In another aspect it relates to the movement or transportation of fluids within arctic regions.

The laying of pipelines and the maintenance of stable pipelines, as well as all other activities in the arctic areas, are difficult tasks indeed. Large and perhaps even huge quantities of oil have been discovered in the Alaskan North Slope Area. Discovery of the oil has been an exceedingly expensive proposition. Getting the oil out of the discovery areas into more hospitable areas for processing or shipment is of itself an even more staggering problem. A pipeline is necessary.

Among the problems being faced by those who must lay and maintain such a pipeline is that of coping with what has come to be termed permafrost. Permafrost and its thin overburden called tundra constitute the ground in most of the arctic land areas. This ground is no ordinary thing.

The arctic region ground is composed of at least two primary upper layers. Firstly is the top or surface layer, the tundra. This is roughly thirty-six to forty inches in thickness, and represents the depth of the ground that melts or thaws in the summer. At least, such summer as the region enjoys.

The next layer, the permafrost, is, as the term implies, permanently frozen. The thickness of the permafrost has been reported to vary from several feet down to a half-mile and more. This permafrost or frozen earth also contains in some places huge ice wedges, and bodies of dry gravel of varying extent and depth. However, for the most part it is a frozen earth-like material.

The temperature of the permafrost is warmer than generally believed, being reported at from about +17 to +19° F. This, despite the average daily maximum temperature for the hottest month, August, of +46° F., and that of the coldest month, January, a —18° F. Average daily maximum may be of some consolation during a —60° F. blizzard. While frozen, the permafrost is exceedingly hard, much harder than ordinary ice of the usual conception, so hard that it crumples even hard steel when efforts are made to force steel pilings into the permafrost.

The tundra, or overburden, is not something with which to trifle. In summer, water collects in pockets beneath the tundra, and such water pockets freeze and push upwards in the winter. Solid ice mountains known as pingos have reportedly been formed in this manner by repeated cycling. Objects buried in the tundra may gradually be ejected to the surface by a heaving action of this tundra in its freeze-thaw cycles.

The tundra and the permafrost act as effective heat insulators, though good electrical conductors. However, when the tundra is removed, and warm weather comes, some of the permafrost melts. Of course, the permafrost tends to melt if exposed to any source of heat.

Once melted, the permafrost loses its great strength with the result that any warm heavy object on or within the permafrost simply tends to gradually sink and disappear by melting its way slowly, but with a terrible sureness, into the depths of oblivion.

I have tried to point out some of the distinctive characteristics of the permafrost and tundra in order to set clearly the scene that is involved in laying a pipeline on, in, or within this arctic area. No ordinary pipeline is involved. Present conception is of a pipeline of 48 inches internal diameter carrying perhaps 1,500,000 barrels or more of produced crude per day, and having an overall length approaching 800 miles from the North Slope discovery area to shipping or refining areas in more hospitable parts of the Alaskan coast. A huge undertaking. More monstrous becomes the problem from the fact that the crude oil comes out of the ground at a temperature of around 160° F. and so is relatively hot.

Picture putting huge quantities of hot crude in a big heavy pipeline and laying same on this layer of frozen ground. The importance and necessity of preventing destruction of this pipeline becomes, then, readily apparent. The crude must be kept at least warm enough so that it will flow, which means utilizing the warmth that it has when it is produced, and even perhaps adding heat at multiple points along the pipeline. If the crude gets too cold, below about 30° F., it can no longer be pumped. Insulation of the pipeline is not the entire answer, since insulation, even the best, only retards heat leakage, but does not completely stop it. Even slight leakage of heat from millions upon millons of barrels of hot oil per day could be devastating.

Having laid the chilling scene as to the problems involved, I now state that my invention solves the problems presented. Hereinafter I show exactly how a pipeline can be laid within this region of permafrost, the pipeline carrying a warm or hot fluid, and yet be so constructed and installed that it will be stable and not sink within the permafrost, nor be heaved upward by the freeze-thaw cycles of the tundra.

Specifically, I lay my pipe on or across supports. These supports are placed on the permafrost or in holes drilled or cut into the permafrost, and extend into permafrost material beyond the area affected by heat leakage from the pipeline. Thusly, my pipeline is permanently supported by permanently frozen permafrost. In fact, I even take advantage of the slight leakage of heat in that the way I lay my pipeline avoids any heaving out of the tundra during freeze-thaw cycles.

Therefore, it is an object of my invention to provide a stable pipeline in permafrost areas. It is another object to provide for the efficient transportation of fluids, particularly liquids, in the arctic areas, fluids warmer than the generally frozen immediate surroundings. An additional object is to provide methods for installing a pipeline to minimize one or more hazards from heaving, sinking, thawing, and/or melting, insofar as feasible in permafrost country. A further object is to provide laterals and supports especially useful in the arctic areas as pipeline supports.

One method, according to my invention, involves the use of lateral supports, either beneath or above the pipeline itself, with each of the lateral supports being of a length sufficient to rest on or within the permafrost beyond an area affected by the heat leakage from the pipeline itself. In an alternate embodiment the laterals are laid on the permafrost and the warm pipeline is held up and away from the permafrost by supports resting on or which are a part of the laterals.

That the support can be above the line of pipe has useful features. In this embodiment, the supports are laid directly upon or in permafrost from which the overburden or tundra has been temporarily removed, and the pipe slung from or suspended below the laterals by straps or other holding devices. The overburden or tundra is then replaced.

Another alternate method is the use of vertical supports placed in a series of holes drilled or cut beneath the line of pipe and extending down into permanently frozen material beyond an area affected by heat leakage from the pipe. The line of pipe itself then rests on the upper ends of such a series of vertical supports.

Heat from the line can thaw a pocket within the permafrost, but the supports extending beyond such pocket effectively keep the pipeline suspended without sinking. The thawed pocket is not a pocket as such, but will be a zone of more or less cylindrical aspect in cross section following with and around the line of pipe.

Thus, my invention basically involves the use of supports extending over, onto or into, permanently frozen permafrost beyond the area of thraw induced by either ambient temperatures or, most importantly, by heat leakage from the pipeline itself. As to the methods of employing my basic inventive concept, there are three as I have discussed above: (1) laying the pipeline on lateral supports, optionally being supported above the laterals; (2) suspending the pipeline below the lateral supports; (3) laying the pipeline on or along the tops of essentially vertically extending supports.

It is not expected that any one of the methods and alternates listed above for my invention would be most suitable for the total length of the pipeline. In some areas, the pipeline may quite suitably be simply buried in the ground, whatever the ground composition may be termed, particularly in areas that are relatively water-free, such as the dry gravel sections I mentioned hereinbefore where there would be little tendency to sink.

Referring now to the drawing I have attached, the several figures of the drawing show various aspects of my invention and the main alternative ways of employing my invention.

Figure 4:
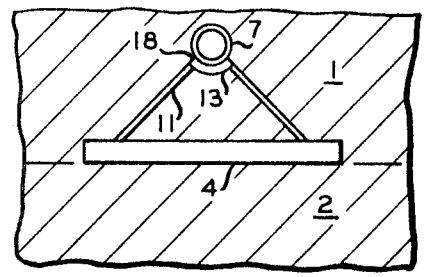

FIG. 4 also is a cross-sectional view of an installed pipeline but shows an embodiment where the line of pipe is laid on elevated supports or legs extending upwards from and supported by the laterals here laid on the permafrost.

Figure 5:
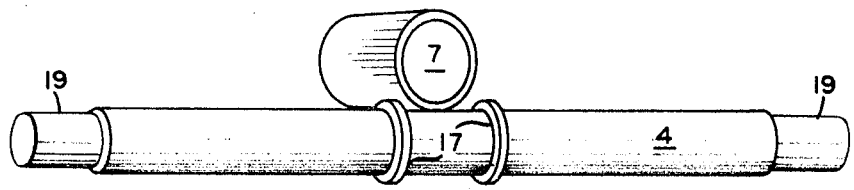

FIG. 5 shows a cylindrical lateral equipped with a pair of collars or guides for the line of pipe together with pipe laid between the guides, and further illustrates that the laterals, if desired, can be of telescopic form or construction.

Figure 6:
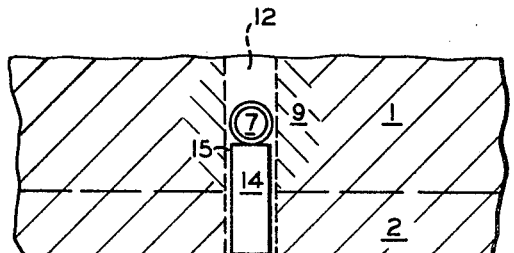

FIG. 6 is a cross-sectional view of an installed pipeline showing an alternate embodiment with the supports extending essentially vertically downward from the line of pipe and into the permafrost.

Figure 7:
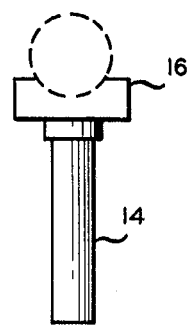

FIG. 7 illustrates a top that can be used, if desired, on vertical supports to guide the line of pipe.

Figure 8:
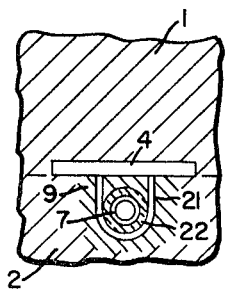

FIG. 8 illustrates another embodiment in cross-sectional view of an installed insulated pipeline, where the line of pipe is slung or suspended from the laterals, in effect, hanging below the laterals within a zone of thaw.

Figure 1:
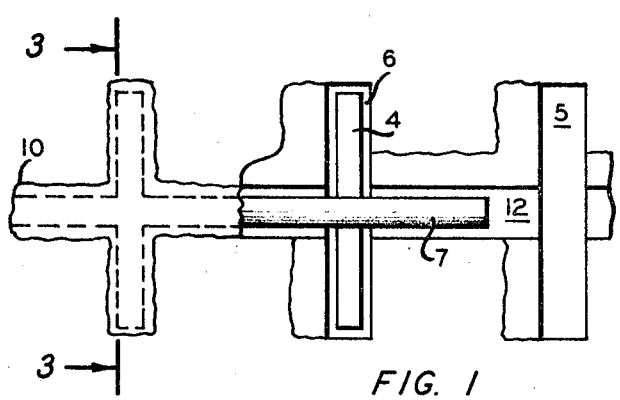
FIG. 1 represents the pipeline installed with laterals extending into or onto the permafrost. This figure further shows three stages of construction: from right to left, ditch and cuts made, laterals and line of pipe installed, backfill in place.
Figure 2:
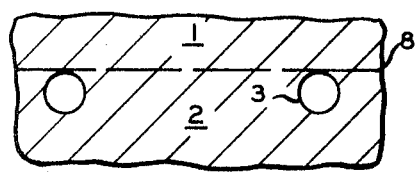
FIG. 2 shows a view of one face of an open cut or ditch with holes for laterals already made into the permafrost.

FIGS. 1, 2, 3 and 5 illustrate the first method of employing my invention, i.e., laying the line of pipe onto lateral supports. FIG. 2 shows a side view of a ditch cut down through the tundra 1 and well into the area of permafrost 2. The ditch is of sufficient width to receive the pipe, to provide necessary working room, and the like. FIG. 2 shows holes 3 cut or drilled or otherwise formed outwardly into the permafrost 2 itself. These holes or cuts 3 are for the laterals and should extend outwardly far enough to be beyond an area subject to thaw from slight heat leakage from the pipeline itself. Into these cuts or holes 3, and also into corresponding cuts or holes on the opposing face (not shown) of the ditch, are inserted laterals or supports (4 in FIG. 1).

These cuts or holes 3 in the permafrost 2, as shown in FIG. 2, can be formed by any suitable method, such as by a drilling device, or cut by the use of a steam lance, and the like. Or, the overburden 1 can be removed, and the holes 3 made in the form of narrow ditches (such as 5 in FIG. 1) cut on or into the upper surface of the permafrost 2, the laterals then laid in such narrow ditches. Thus, it will be seen that the holes or cuts or narrow ditches, whatever they may be termed, to receive the laterals can be formed into the permafrost layer just below the tundra-permafrost line 10, well below, or essentially into the surface of the permafrost layer, as may be desired or preferable in various types of the ground in the permafrost area.

Referring now to FIG. 1 of the attached drawing, once the laterals 4 are put into place 6, prepared such as described above, the line of pipe 7 is laid on the laterals 4. The initial ditch and lateral cuts are illustrated in the right hand one-third of FIG. 1. The laterals in place with the line of pipe thereon are illustrated in the center one-third of FIG. 1. After the laterals and line of pipe are in place, the installation is then backfilled 10 to cover the entire pipeline 7 and supports 4 in order to protect the various members from the elements and other hazards. The backfilled assembly is shown in the left hand one-third of FIG. 1.

The backfill or replaced tundra acts primarily as an insulating cover, both to keep out the heat, if it can be called that, of the short summer so as to avoid excessive thawing in the line of pipe area, as well as to help retain heat in the pipeline even in the depths of the winter darkness so that the liquid contained in the pipeline will continue to flow without requiring an undue number of way stations for heat to be reapplied.

Figure 3:
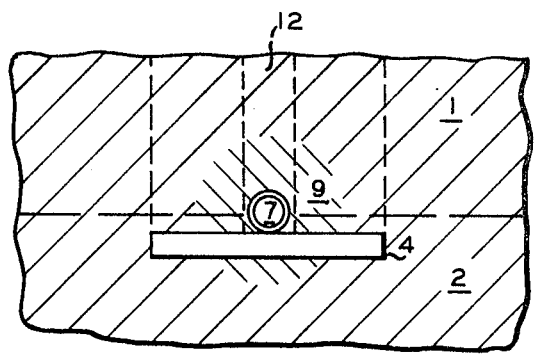
FIG. 3 is a cross-sectional view of an installed pipeline taken across a–a' of FIG. 1. This shows an embodiment with the line of pipe laid on the laterals.

FIG. 3 is a cross-sectional view taken at line 3—3 through the installed pipeline shown in FIG. 1, with the section taken across the completed and backfilled line. The upper area in FIG. 3 is the overburden or tundra 1, subject to summer melt and winter freeze. The lower area is the permafrost 2 which is not subject to summer thaw, but stays permanently frozen unless a secondary heat source is involved. Of course, that is exactly what is provided by pipeline 7, since, even though insulated, some slight out-leakage of heat will be involved.

Under winter conditions both the tundra overburden 1 as well as the permafrost 2 will be solidly frozen. That is, except for the more or less circular zone 9 immediately surrounding the length of the line of pipe 7 itself. It is excepted that slight heat leakage from the contents of the pipeline 7 outwardly into the surrounding ground area will create a soft or unfrozen area 9. This unfrozen area or continuously thawed zone 9 may vary in surrounding diameter depending somewhat on ambient conditions and the overall depth of the cold in the arctic winter, but mostly on the amount of heat leaking outwardly from the pipeline 7. Therefore, this area of thaw 9 even in mid-winter can be expected to reach somewhat into the tundra 1, somewhat into the permafrost 2. This, then, is the reason that the laterals 4 must extend well beyond such area 9 out into the area of permanent permafrost 2 unaffected by heat leakage.

Of course, the extent of the heat leakage-induced thaw area also will depend on just where the line of pipe itself is placed. If it is placed well down into the permafrost area, then the zone of thawed ground which will largely surround the line of pipe itself will tend to be down within the permafrost layer essentially. Or, if the line of pipe is more or less at the demarcation line, which line may be somewhat of a variable from one season to the other, the zone of thaw will be partly in the tundra and partly within the permafrost. Or, if the line of pipe is supported well above the permafrost, as discussed in one embodiment hereinafter, the zone of the thaw may not reach the permafrost, or only touch it lightly so to speak.

In another embodiment, illustrated by FIG. 8 on my drawing, the laterals 4 are placed on or in the permafrost 2 as discussed hereinbefore, and the line of pipe 7 slung from or suspended 21 from the laterals 4, in effect hanging below the laterals 4. In this case, much of the zone of thaw 9 will be within the permafrost 2 itself. In this latter embodiment, the laterals 4 are of sufficient length to extend beyond any zone of thaw 9 well into or over onto areas of permanently frozen permafrost 2. The line of pipe 7 can be insulated 22, if desired, and preferably will be insulated in most areas to reduce heat losses from the warm oil to the surroundings.

As can be seen from FIGS. 1, 2, 3, 4 and 5, normally a longitudinal ditch or cut 12 in the ground is made as wide as necessary to suitably lay the pipe 7 itself, and then at intervals wider lateral cuts 5 can be made in which the laterals 4 are placed. Or, as we have discussed hereinabove relative to FIG. 2, the ditch 12 can be cut as wide as necessary for the pipe itself, and holes 3 drilled or otherwise formed laterally out into the permafrost 2 in which the laterals 4 are then inserted.

Another method of laying my stable pipeline involving lateral supports is shown in FIG. 4. The view shown is a cross-section taken very similarly as was FIG. 3 at 3—3 across FIG. 1. However, in the particular embodiment illustrated by FIG. 4, a cut is made in the tundra 1 leaving the permafrost 2 essentially untouched. At intervals, 4 are laid down on the permafrost layer 2. On these laterals 4 are placed legs 11. Or, it is quite feasible for the laterals 4 and legs 11 to be structurally integrated into unitized or even a preformed member.

There can be, on each lateral, one leg, two legs, three legs, or even more if desired. The leg or legs rise to an apex 18 essentially above the center of the supporting lateral, and there hold the line or pipe. On a practical basis, the leg or legs should end in a guide or saddle 13 at the apex 18 to guide or support the line of pipe 7. A type of guide or saddle similar to that which can be used on a one leg construction is illustrated by 16 in FIG. 7.

The line of pipe 7 is laid on or along the guides or saddles 13, and the excavation area of tundra 1 then completely backfilled. It may be desirable, in actual installation of my pipeline using this embodiment, to first install the laterals and vertical members supported by the laterals, backfill up to the line of the tops of the vertical portions of the supporting members, or to the line of the guides or saddles, then lay the pipe thereon, and finally finish backfilling. This would help provide structural support for the overall pipeline assemblage during installation.

In the embodiment illustrated in FIG. 4, the laterals 4 resting on the permafrost 2 form a stable base not subject to the vague unease of the tundra 1 in its freeze-thaw cycles. At the same time, the guides or saddles 13 and the leg or legs 11 supported by the laterals 4 hold the line of warm pipe 7 well up away from the zone of permafrost 2, so that any heat leakage from the line of pipe 7 will have minimum opportunity to attack the permafrost 2. And, even if some small amount of heat does reach the permafrost 2, the extending lengths of the laterals 4 provide a bridge across any thawed area.

FIGS. 6 and 7 show alternate means of installing the pipeline 7 with the supports 14 extending essentially vertically downwardly from the line of pipe 7. FIG. 6 illustrates a cross-sectional view of an installation with the tundra or overburden 1, and the permafrost 2. It is seen in FIG. 6 that the vertical supports 14 extend well down into the permanently frozen permafrost area 2. The tops 15 of these vertically extending supports 14 will extend upwardly essentially up to or slightly above the lower depth of the ditch 12. The line of pipe 7 is laid on or along the protruding tops 15 of the vertical supports 14. The shaded zone 9 immediately surrounding the line of pipe 7 illustrates the area expected to be more or less thawed during the winter months. Of course, the tundra 1 itself would be thawed in any event during the summer months. My previous remarks hereinbefore concerning the variation in location of the cylindrical zone of heat-leakage-induced-thaw following alone and around the line of pipe are appreciable, of course, to this embodiment.

FIG. 7 illustrates a top or saddle or pipe-guide 16 that can be used, if desired, on the vertical supports 14 to hold or bed or guide or nest the line of pipe. Also, similar types of tops or saddles 16 are useful in my previously discussed embodiment wherein one or more vertical supports are held up by, or are an integral part of, a lateral so that the line of pipe is held up above the permafrost.

One of the lateral supports 4 used in several of my embodiments is shown in particular in FIG. 5. Guides 17 as shown may be a convenience with these lateral supports 4. These guides, or collars 17, help to guide, in effect, the laying of the line of pipe 7 over or along the series of laterally extending laterals 4. If desired, the laterals 4 can be of telescopic construction. Such construction can be of considerable convenience in that the laterals 4 can be placed in a ditch no wider than the minimum length of the lateral 4, and then extending portions 19 of the laterals 4 moved outwardly into, for example, holes which have been cut into the trench wall into the permafrost. This method of construction minimizes damage to the permafrost. The lateral 4 illustrated in FIG. 5 is shown with two telescopically extending members 19 extending from the ends of the lateral 4. Such telescopic construction can be at only one end, or as shown at both ends of the lateral 4. The extending member or members 19 can move outward from inside the main lateral 4, as illustrated, or can be of sleeve construction around the outside of one or both ends of the central lateral.

The lateral supports and the vertical supports may be of various cross-sectional shapes or configurations. The shape may depend on the manner of placement, or the method by which a position for the lateral or support is formed, or on the type of material of construction that may be involved. The laterals or supports may be essentially round or cylindrical, square, rectangular, oval. They usually will be solid, though hollow construction in some locations or for smaller pipes may prove desirable. Even a tubular or slip-tube sectional construction can be helpful in some situations, such as illustrated by FIG. 5 as discussed hereinabove. For example, where it is desired to insert long lateral supports into opposing holes of a ditch or cut, the laterals can be formed of two or more piece slips sections of a telescopic nature with minimum length essentially the width of the ditch or less, and the telescope sections then pushed outwardly into the ends of the opposing holes of the ditch. Configuration also may be influenced by factors of heat conduction.

Materials of construction used in the laterals and supports preferably should be of nonheat-conducting materials. It would be possible for metal laterals and supports, or combinations of metal and other materials to be utilized. Metal supports, because of their strength, can have advantages in some types of arctic ground. However, it is expected that nonheat-conducting materials will be most advantageous in the practice of my invention, because of the necessity, with permafrost, to avoid transmitting heat into the permafrost insofar as is possible to do so.

The nonheat-conducting properties and high strength properties of some plastic materials will be useful, where such are available in suitable quantity and cost. Wood, though suitable, often is not readily available in much of the arctic area. Wood can deteriorate in time with repeated exposure to variations in temperature and water, and this will be a caution due to exposure to water in the tunda when tundra melts. Concrete, particularly reinforced concrete, in the form of cylinders or long blocks, is suitable; or even ceramic materials of various types, or tiles. The requirements primarly are strength to support the load of the pipeline, essentially nonheat-conducting, generally unaffected by wide ranging changes of temperature, preferably minimally affected by varying exposure to water, and preferably noncorrodible.

No one method of installing by pipeline will be suitable for its entire length. The variations of my pipeline and method of installing same will be useful in various areas, depending upon the general temperatures, the thickness of the tundra overburden, and other factors as I have discussed. Nor is my invention limited to the major pipelines. It will prove useful in the thousands of miles of pipe network which will evolve within a great oil producing region. The embodiments of my pipeline are particularly suitable for the arctic permafrost regions and are not limited to carrying oil, but can also be useful for the transportation of water, or salt water, stream, or fluids for disposal.

I have discussed hereinabove how to place the laterals, the vertical supports, and combinations thereof; the configuration of laterals and support; as well as collars for horizontal laterals, and caps or supports for the vertical supports. I have discussed hereinabove the factor of the zone of thaw which will largely follow in a more or less cylindrical pattern around and surrounding the line of pipe. The manner in which I provide my laterals and supports, together with the zone of thaw, will provide a stable pipeline, not subject to sinking, or heaving, in permafrost country.

Reasonable variations and modifications of my invention are possible within the scope of the disclosure without departing from the scope and spirit thereof as I have disclosed in the specification hereinabove and the claims hereinafter.

I claim:
1. A method for laying a pipline in the arctic area which comprises
 (a) cutting a ditch in the ground in the said arctic area at least to the permafrost through the depth subject to seasonal freeze-thaw,
 (b) installing in said ditch a series of spaced laterally extending supports so that a portion of each said laterally extending support is exposed within the ditch and another portion extends into the ground beyond the area subject to heat-induced thaw,
 (c) laying said pipeline along the exposed portions of said laterally extending supports, and
 (d) backfilling said ditch whereby the said pipeline laid in said ground is substantially stable against the hazards of heaving and sinking.

2. The method according to claim 1 wherein step (c) the pipeline is suspended below said supports.

3. The method according to claim 1 wherein the said ground consists essentially of tundra and permafrost, and the cutting step (a) is to a depth essentially through the tundra down to the permafrost and wherein the said supports in step (b) are laid essentially onto the said permafrost.

4. The method according to claim 1 wherein a plurality of said support members have at least one guide collar.

5. The method according to claim 1 wherein the said ground consists of tundra and permafrost and wherein in step (b) each said support is a lateral and has at least one upwardly extending leg extending above said permafrost and wherein in step (c) said pipeline is laid along the upper ends if said legs above the said permafrost.

6. The method of claim 1 wherein the said pipeline is further characterized by being insulated.

7. A pipeline assembly as a stable conduit for the movement of warm fluids in areas subject to permafrost, said pipeline assembly comprising in conjuction a pipeline and a support assembly therefor, said support assembly comprising a series of spaced support members constructed of substantially nonheat-conducting materials, each of said support members installed beneath said pipeline laid thereon and having a length sufficient to extend laterally relative to said pipeline into the said permafrost and beyond a zone of thaw induced by heat released from said warm fluids contained in said pipeline; and the whole of said pipeline assembly buried with backfill.

8. A support member for an arctic region wherein said support member is a lateral and is telescopically constructed of at least two extendable slip sections.

9. A support member for an arctic region pipeline wherein said support member comprises a lateral and at least one upwardly extending support leg with a saddle on the upper end of said leg.

References Cited

UNITED STATES PATENTS

| | | | |
|---|---|---|---|
| 1,302,757 | 5/1919 | Barber | 248—49 |
| 2,002,103 | 5/1935 | Wheeler | 248—49 |
| 2,355,966 | 8/1944 | Goff | 61—72.1 |
| 2,774,383 | 12/1956 | Kidd | 61—721 |
| 3,135,097 | 6/1964 | Scheinberg | 61—36 X |

OTHER REFERENCES

Arctic Construction Manual CN–CO22–12, October 1961, pp. 3, 4, 6, 7 and 10.

JACOB SHAPIRO, Primary Examiner

U.S. Cl. X.R.

61—36 72.1; 138—32; 248—49